(12) United States Patent
Rölver

(10) Patent No.: US 12,704,222 B2
(45) Date of Patent: Aug. 11, 2026

(54) GAS MANAGEMENT APPARATUS, AND METHOD FOR CONDITIONING ANODE GAS OF A FUEL CELL

(71) Applicant: HENGST SE, Münster (DE)

(72) Inventor: Martin Rölver, Havixbeck (DE)

(73) Assignee: Hengst SE, Münster (DE)

( * ) Notice: Subject to any disclaimer, the term of this patent is extended or adjusted under 35 U.S.C. 154(b) by 351 days.

(21) Appl. No.: 18/549,515

(22) PCT Filed: Mar. 8, 2022

(86) PCT No.: PCT/EP2022/055903

§ 371 (c)(1),
(2) Date: Sep. 7, 2023

(87) PCT Pub. No.: WO2022/189437

PCT Pub. Date: Sep. 15, 2022

(65) Prior Publication Data

US 2024/0142054 A1 May 2, 2024

(30) Foreign Application Priority Data

Mar. 9, 2021 (DE) ..................... 10 2021 105 669.1

(51) Int. Cl.

| | |
|---|---|
| ***F16T 1/12*** | (2006.01) |
| ***H01M 8/04119*** | (2016.01) |
| ***H01M 8/04223*** | (2016.01) |

(52) U.S. Cl.

CPC ........... *F16T 1/12* (2013.01); *H01M 8/04164* (2013.01); *H01M 8/04179* (2013.01); *H01M 8/04231* (2013.01); *H01M 8/04253* (2013.01)

(58) Field of Classification Search

CPC . F16T 1/12; H01M 8/04164; H01M 8/04179; H01M 8/04231; H01M 8/04253

See application file for complete search history.

(56) References Cited

U.S. PATENT DOCUMENTS

| | | |
|---|---|---|
| 10,991,958 B2 | 4/2021 | Hosoi et al. |
| 2014/0377671 A1 | 12/2014 | Milacic et al. |
| 2019/0363375 A1 | 11/2019 | Hosoi et al. |

FOREIGN PATENT DOCUMENTS

| | | | |
|---|---|---|---|
| DE | 102012020280 | 11/2013 | |
| DE | 102016222250 A1 | 5/2018 | |
| DE | 102019113605 A1 | 11/2019 | |
| DE | 102023135394 A1 * | 6/2025 | ............. B01D 50/00 |

(Continued)

OTHER PUBLICATIONS

International Search Report and Written Opinion for corresponding International Patent Application No. PCT/EP2022/055903 dated Jul. 25, 2022; priority document.

(Continued)

*Primary Examiner* — P. Macade Nichols

(74) *Attorney, Agent, or Firm* — Greer, Burns & Crain, Ltd.

(57) ABSTRACT

A gas management apparatus and a method for conditioning anode gas of a fuel cell. The apparatus comprises a fluid tank and a water separator that is fluidically connected thereto, a drainage valve being arranged in the upper area and/or above the top side of the fluid tank. During proper operation, gases and liquids, in particular water, are drawn off via said one drainage valve.

14 Claims, 10 Drawing Sheets

(56) References Cited

FOREIGN PATENT DOCUMENTS

| | | | |
|---|---|---|---|
| JP | 2005327665 | A | 11/2005 |
| JP | 2006147455 | A | 6/2006 |
| JP | 2008262867 | A | 10/2008 |
| WO | 2008090430 | A1 | 7/2008 |

OTHER PUBLICATIONS

German Search Report for corresponding German Patent Application No. 102021105869.1 dated Dec. 15, 2021; priority document.

* cited by examiner 1
2
4
5
6
10
11
16
17
18
19
20
21
25
30
PRIOR ART 2
2.1
2.2
3
3.1
3.2
4
5
6
7
7.1
7.2
8
9
12
14

8
9
7
13
3
4
6
2

GAS MANAGEMENT APPARATUS, AND METHOD FOR CONDITIONING ANODE GAS OF A FUEL CELL

CROSS-REFERENCES TO RELATED APPLICATIONS

This application is a national phase of International Patent Application No. PCT/EP2022/055903, filed on Mar. 8, 2022, which claims the benefit of German Patent Application No. 10 2021 105 669.1, filed on Mar. 9, 2021, the entire disclosures of which are incorporated herein by way of reference.

FIELD OF THE INVENTION

The present invention relates to a gas management apparatus for conditioning anode gas of a fuel cell, and in addition to an associated method.

BACKGROUND OF THE INVENTION

In the chemical reaction in a known fuel cell, hydrogen-rich (H2-rich) process gas or a process fluid is chemically converted, in particular into water (H2O), by supplying atmospheric oxygen. The H2-depleted exhaust gas is at least partially conducted in the circuit and enriched with H2 gas to a required concentration before being reintroduced into the fuel cell. Furthermore, the by-products and foreign substances, in particular water (H2O) and nitrogen (N2), must be removed from the exhaust gas of the fuel cell.

From the prior art, various devices and processes are known for efficiently processing the anode gas, in particular for realizing the water separation and gas removal (purging). For example, DE 10 2012 020 280.6 A1 discloses a water separation unit in which an outlet valve is arranged underneath the collection tank, enabling both water discharge and purging, the gas being supplied via a riser pipe that extends into the gas space of the collection tank from below, so that gas is discharged downwards from the upper gas space.

However, it has turned out to be a problem, not adequately solved so far, to carry out the dewatering and the gas removal (purging) when ice formations occur in the collecting tank of the water separator, which cause closing of the outlets and also freezing of the drainage valves. This ice formation occurs almost exclusively when the fuel cell is at an operational standstill, which complicates or prevents the necessary purging before the motor is started.

An aim of the invention is thus to provide a device and a method by which the treatment of anode gas is made possible even when there is ice formation in the water separator.

SUMMARY OF THE INVENTION

According to the invention, this aim may be achieved by a gas management apparatus having the features described herein. Furthermore, a method according to one or more embodiments may also achieve this aim. Advantageous embodiments and further developments of the apparatus according to the invention and of the method result are also described herein.

In this context, the gas management device according to the invention for conditioning anode gas of a fuel cell comprises a fluid tank and a water separator, the water separator being fluidically connected to the fluid tank and/or being arranged in its interior. Furthermore, a gas supply line, in which the exhaust gas from the fuel cell is conducted, leads into the water separator, and a gas drainage pipe leads out of the water separator again. Furthermore, a riser is provided, which is connected with its lower end to a lower area of the interior space, namely where the water separated from the exhaust gas first collects, and/or the riser projects into the interior space. The riser is connected with an upper end to a drainage valve. Ideally, the drainage valve is situated outside the interior of the fluid tank.

The core of the invention consists in the fact that the drainage valve is arranged in the upper area and/or above the top side of the fluid tank, and furthermore gases and liquids, here in particular water, can be discharged via the same drainage valve during proper operation. The discharge is usually into a central drainage pipe, although this is not to be understood as limiting, and a complete or partial use of the fluids, here in particular of the water, in at least one subsequent process step is encompassed by the present invention.

By arranging the release valve in the upper area and/or above the top side of the fluid tank, the release valve is reliably prevented from freezing. Furthermore, due to the only one drainage valve for gases and fluid, a major advantage, in addition to improved economy, is that the installation space is reduced and weight savings are achieved.

In the present specification, the terms "riser pipe" and "riser" will be used interchangeably. The riser may be formed as an integral element of the tank wall in that the tank wall forms a portion of the wall surface of the riser, and at least a portion of the other conduit wall projects into the interior or lies outside the fluid tank. The bottom opening of the riser is located adjacent to or a short distance from the inner bottom of the fluid tank. Furthermore, the riser can be designed as a freely suspended line whose free, lower end is positioned a short distance above the inner bottom of the fluid tank. Here, free suspension includes providing one or more braces to at least one container wall, if necessary.

In an improved variant, at least one bypass line is provided in the riser, through which the interior of the fluid tank is fluidically connected to the riser so that a constant pressure equalization takes place. To avoid accretions, it is advantageous if the bypass line is located in the upper area of the fluid tank, which is usually filled with gas during normal operation. As a very advantageous and economically favorable solution, the bypass line can be made as a small bore or opening between the interior and the riser.

An improved variant is formed such that the bypass line is provided with a valve, i.e. a valve is provided in or adjacent to the line path of the bypass line. This valve can be, in particular, a passive check valve or a pressure relief valve. This valve is open in the permanent state, or in the normal state. Above a limit value in the riser or a limit value difference between the riser and the interior of the fluid tank, such as in particular the volume flow and/or the internal pressure, the valve closes until the limit value or the limit value difference is undershot again.

Another improved embodiment is that an emergency valve is arranged in the riser or towards the riser in the upper area of the interior. In this way, in particular in the event of a critical pressure increase in the interior, an additional fluidic connection from the interior of the fluid tank into the riser can be established via which gases and liquids can be discharged quickly. This is necessary for example if the lower interior is iced and the lower end of the riser is closed as a result. In an advantageous variant, the emergency valve is a pressure relief valve, designed for example as a preloaded, passive pressure relief valve.

With regard to the position of the bypass line and the emergency valve, it is particularly advantageous if the bypass line is located in the interior of the fluid tank above the emergency valve. Furthermore, it is advantageous overall to also arrange the emergency valve as high as possible in the interior of the fluid tank.

An advantageous embodiment provides that the emergency valve and/or the bypass line are arranged in the area of or even above the water separator, so that the highest possible position in the gas-filled volume is ensured. This embodiment is particularly suitable if the water separator and the fluid tank form a closed structural unit.

In a further variant, it is provided that at least one further vent line is provided via which the interior can be fluidically connected to the drainage valve. This further vent line has no direct fluidic connection to the riser. In this case, the drainage valve is designed as a multi-port valve.

An improvement of the above variant is that the drainage valve, designed as a multi-port valve, has internal line paths in a valve position in which a fluidic connection can be established between the interior of the fluid tank and the riser. Via this position, a pressure equalization between the riser and the interior is possible via the drainage valve.

In one embodiment, the drainage valve is provided with such internal line paths in a valve position in which a line connection can be made between the interior of the fluid tank and the central drainage pipe, with simultaneous closing of the riser. This valve position enables a direct, fast purging of the interior even if the riser is still filled with fluid that is not to be discharged, or if it is iced up. Advantageously, in this embodiment the bypass line in the interior of the fluid tank can be omitted. Furthermore, the emergency valve can also be omitted, because until the ice has thawed it is sufficient to start operation if a pure gas removal (pure purging) is carried out while the fluid tank is still largely filled with ice and water.

It is therefore also an overall economic advantage if, in all the above-mentioned embodiments and variants, two separate valves, with the respective associated lines, are not provided for the discharge or removal of gases and/or water from the anode gas circuit.

The method according to the invention for operating a fuel cell and for discharging gases and/or liquids from an anode gas circuit comprises supplying the gases and/or liquids to a water separator via a gas supply line downstream of the fuel cell and discharging separated liquid, in particular water (H2O), into a fluid tank. This operation comprises the following steps:

- at least partial draining of the fluid tank via a drainage valve,
- at least partial discharge of the gas from the anode gas circuit and introduction of clean gas (H2) into the anode circuit.

The core of this method according to the present invention is that the discharge of gases from the anode gas circuit and/or the discharge of liquids from the fluid tank takes place via the same drainage valve. Here the drainage valve is located in the upper area and/or above the top side of the fluid tank. This means that for discharge from the fluid tank the fluid (water or gas) can be directed upward, where the drainage valve is also located.

The great advantage is that during normal operation, there is never any liquid directly at the valve, and ice formation cannot cause freezing of the drainage valve during a process standstill. Furthermore, process control is simplified by having only one drainage valve.

In an improved method variant, in the discharge step the gas, in a first partial step, pushes liquid that is present forward, through the drainage valve. In a subsequent second substep, the portion of gas to be discharged is then conducted through the drainage valve.

Advantageously, the method according to the invention uses one embodiment or a combination of embodiments of the above-described gas management apparatus for conditioning anode gas of a fuel cell.

In an improved embodiment of the method, an emergency discharge step is provided in which, in the event of an excessive pressure rise and/or icing in the lower region of the interior, an emergency valve is opened in the upper region of the interior and fluids that are present are drained from the interior via the riser and the drainage valve. As a rule, the discharge takes place into a drainage pipe situated downstream of the drainage valve.

A further improvement of the method is that the bypass line is closed when at least one limit value in the riser, such as the internal pressure and/or the volume flow, is exceeded. Advantageously, a passive check valve and/or pressure relief valve is used for this closure. This prevents excessive backflow into the interior of the fluid tank when draining water or purging, reducing the times for these steps (draining water and discharging gas).

In the present context, "fluid" shall be understood to mean a gas or liquid, unless otherwise indicated. Furthermore, it will be immediately understood by a person skilled in the art that, depending on the process phases and process locations, the "gases" will have different compositions and concentrations of gas constituents and water contents. These relationships are known in the prior art. Therefore, for simplicity, only the term "gas" or "gases" is used, which is always understood to mean the respective gas or gas mixture, depending on the location and the method step, unless explicitly stated otherwise.

BRIEF DESCRIPTION OF THE DRAWINGS

In the following description of the Figures, the same parts in the various drawing Figures are always given the same reference signs, so that it is not necessary to explain all the reference signs again for each drawing Figure.

In the present application, the arrangement relative to the spatial positions is significant, so that indications of "top," "above," "upper," "bottom," "below," or "lower" refer to the general horizontal or vertical as determined by gravity. Furthermore, in indications of the orientation of the apparatus according to the invention, the position and orientation are always to be understood that results during proper operation and/or the proper installation situation, unless otherwise expressly stated.

Figure 1:
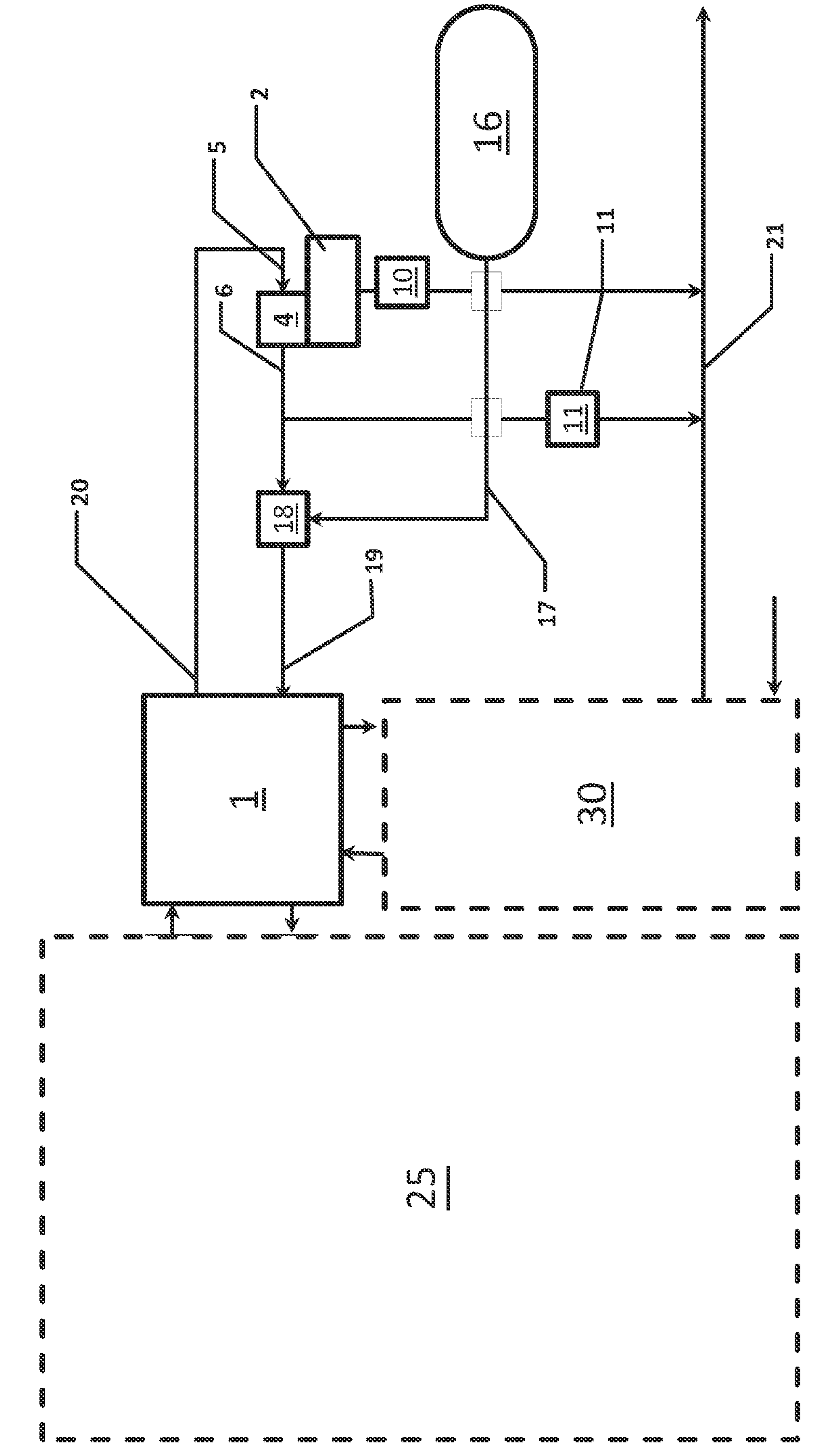
Figure 2:
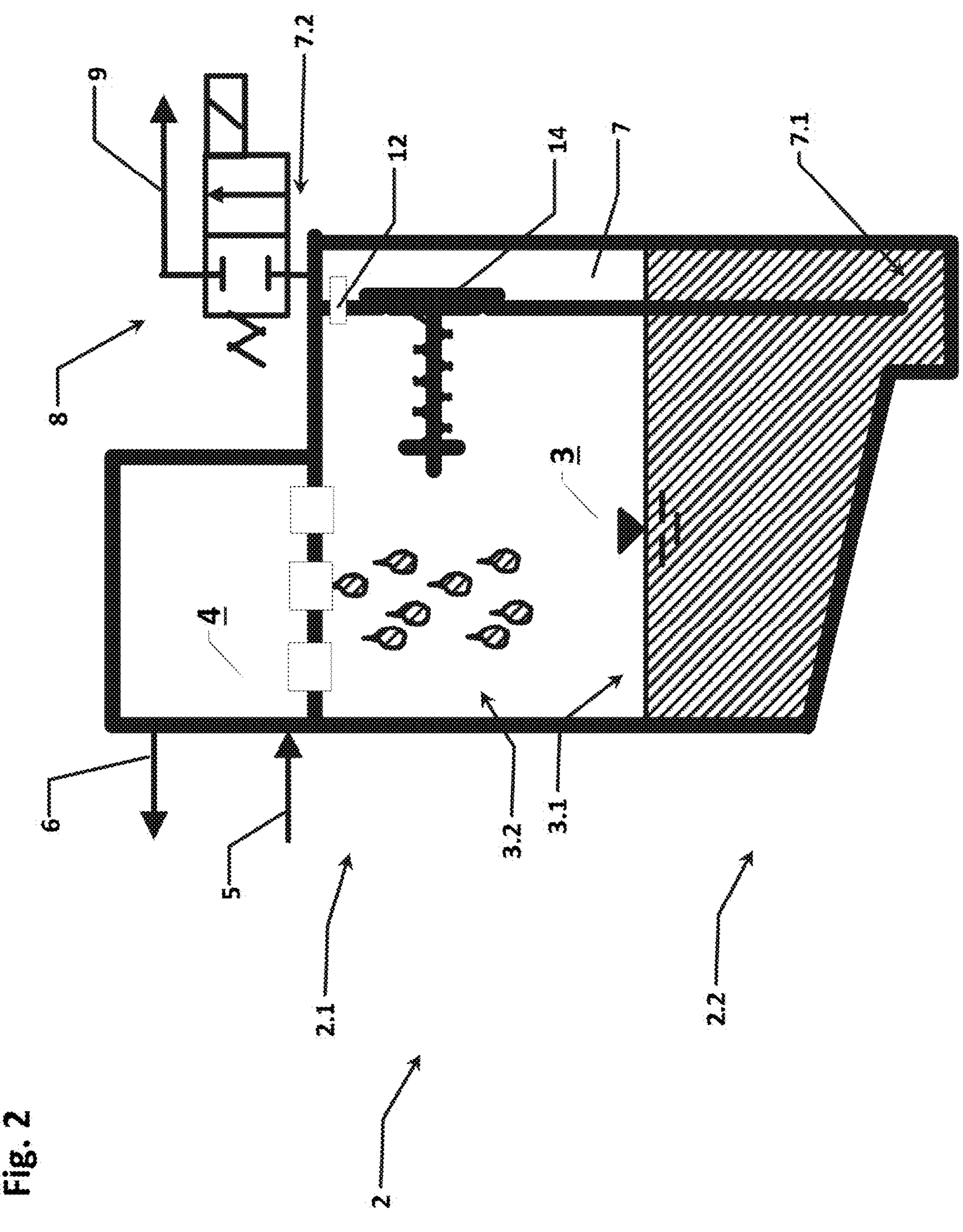
Figure 3:
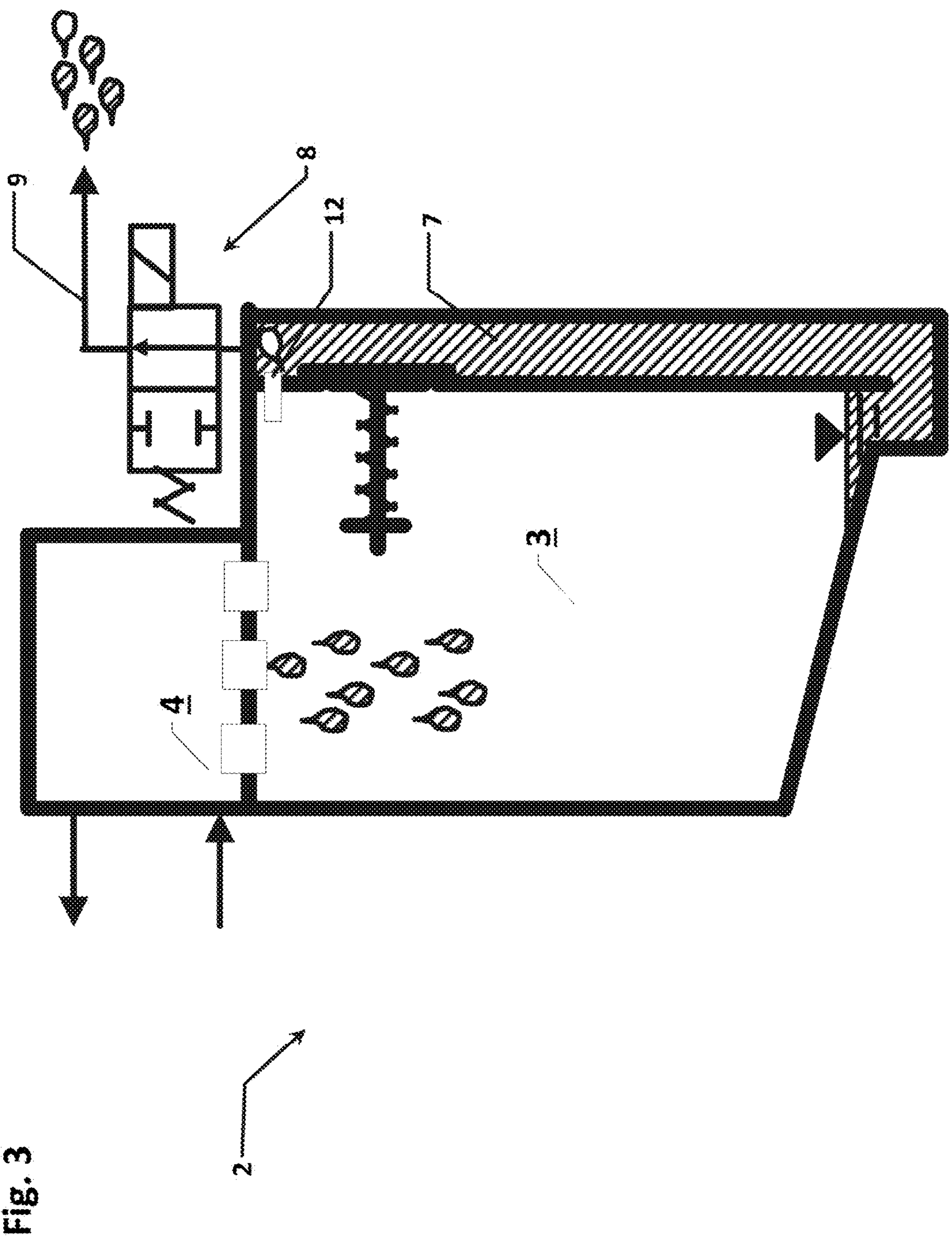
Figure 4:
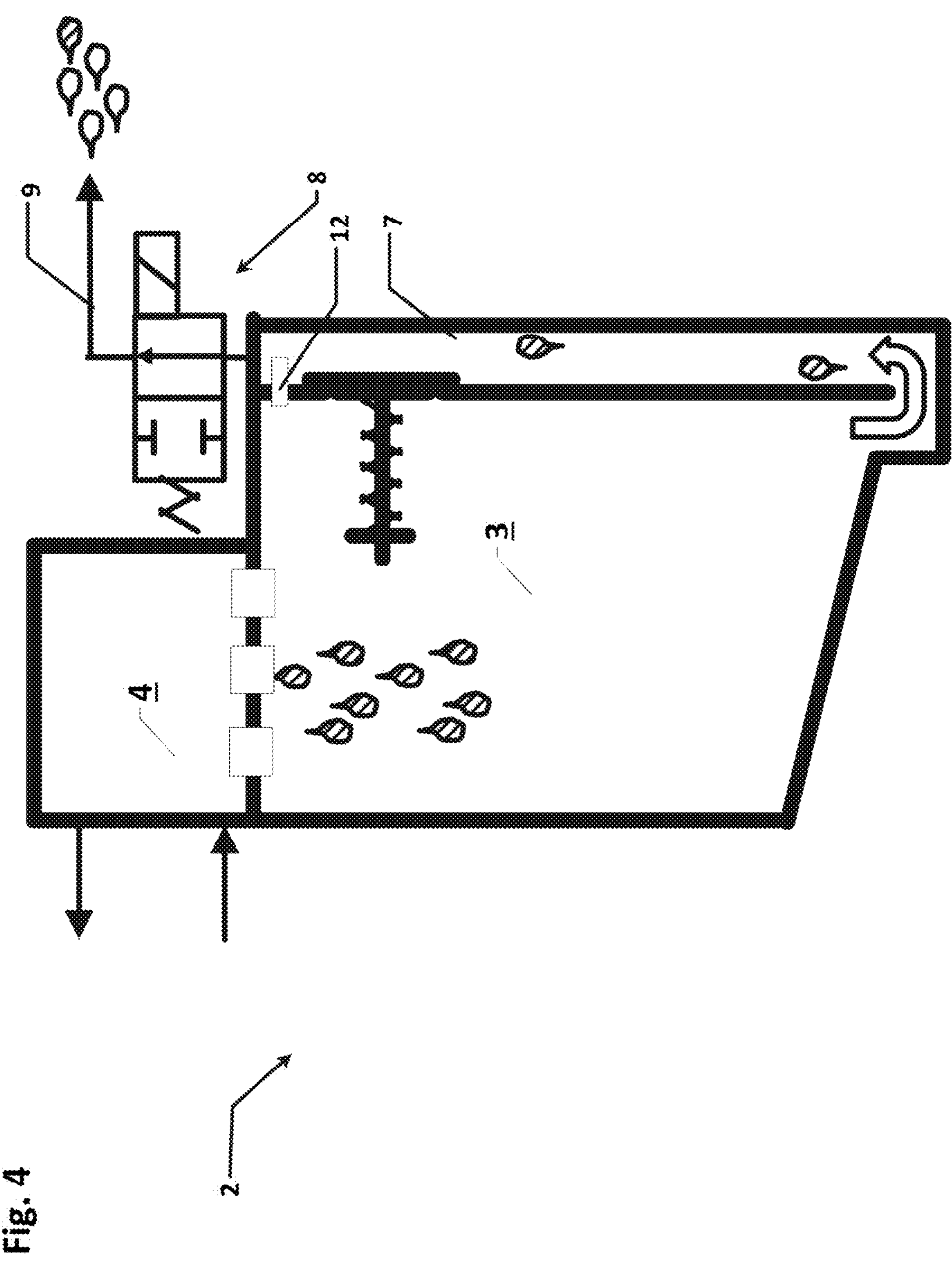
Figure 5:
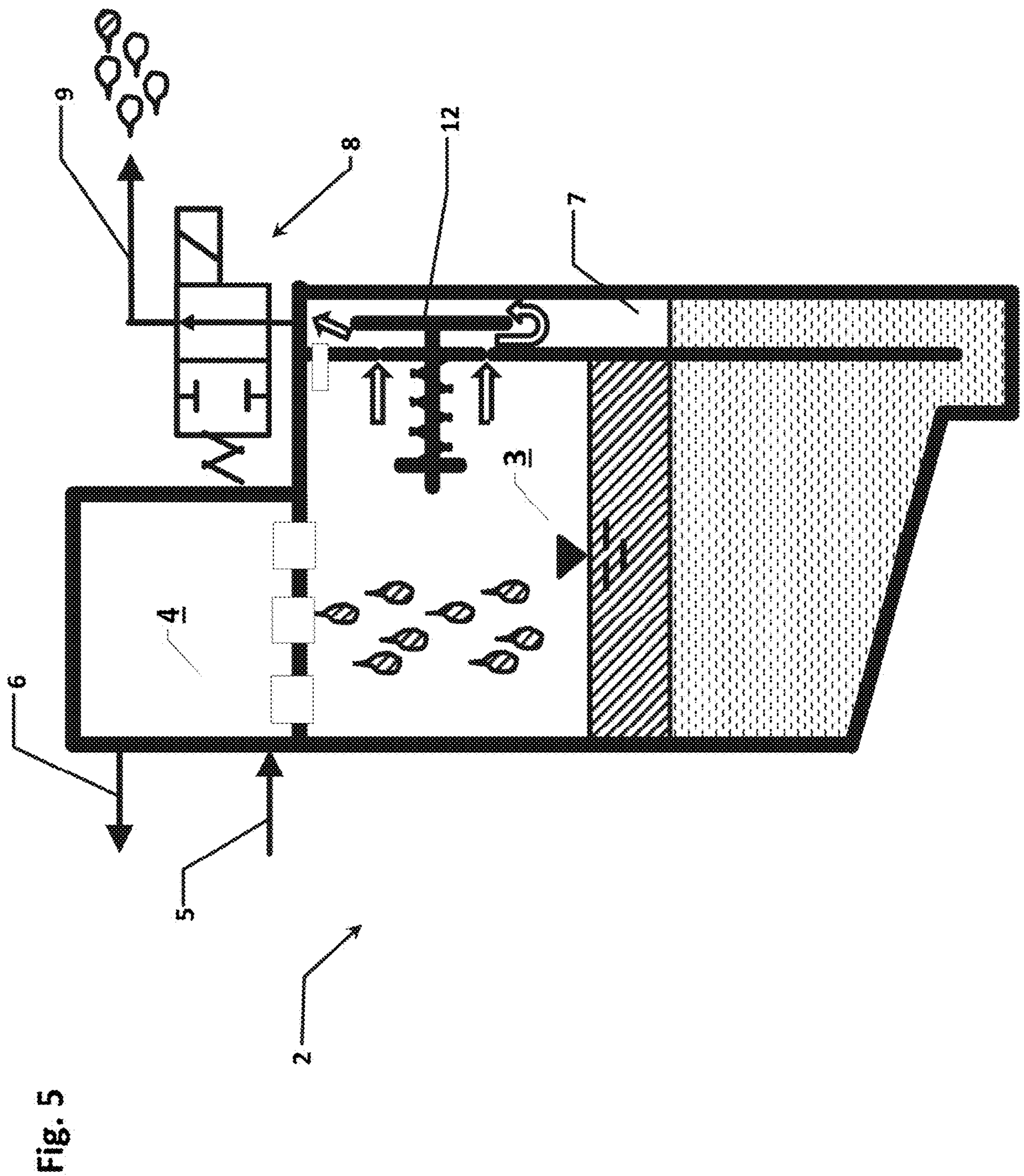
Figure 6:
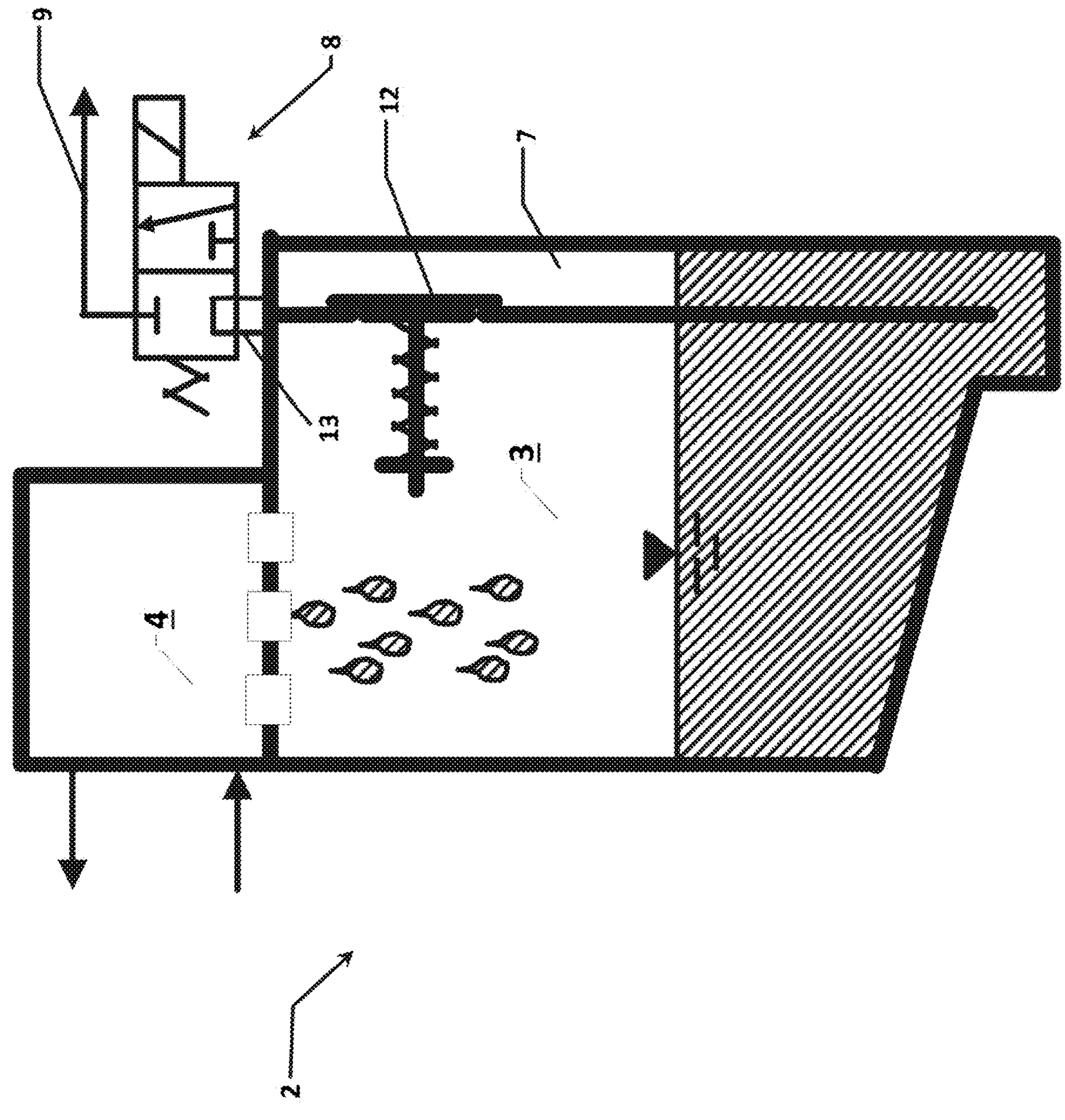
Figure 7:
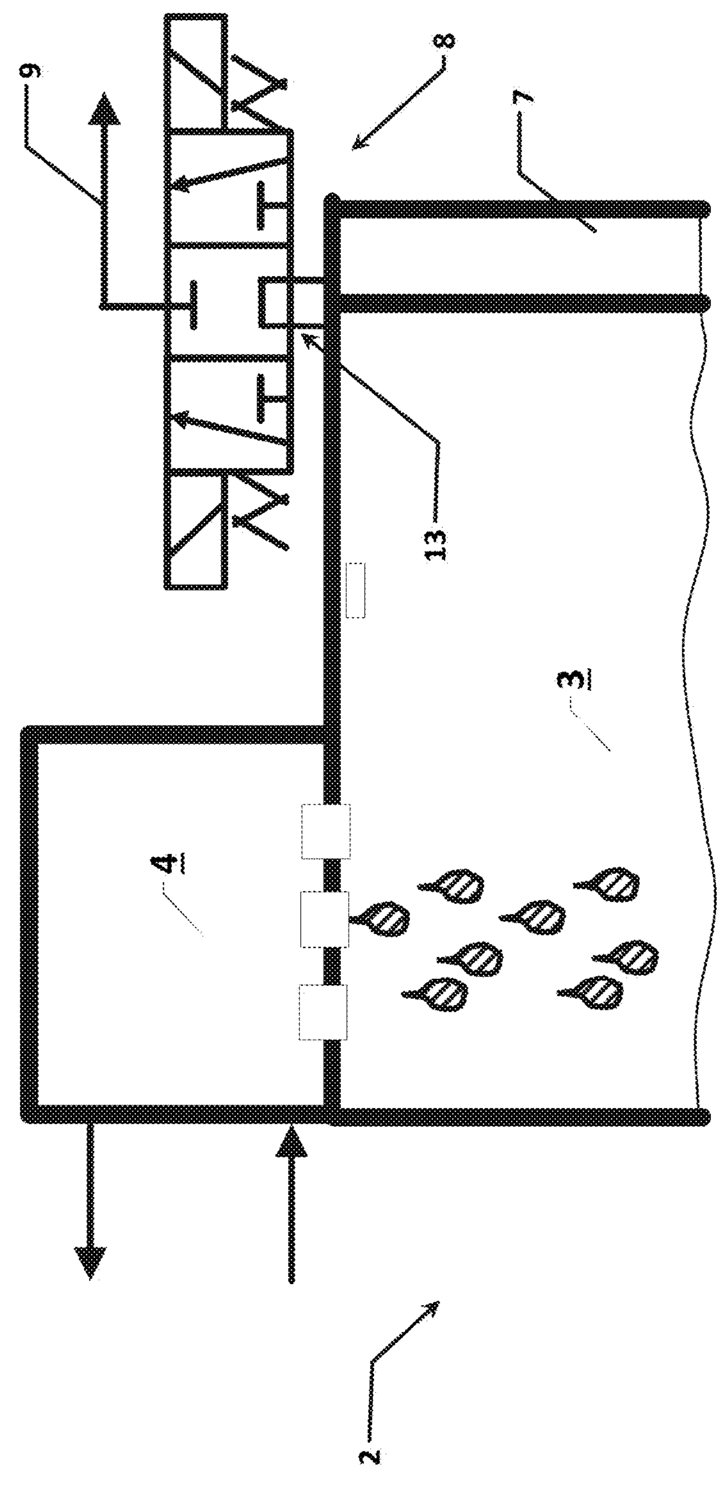
Figure 8:
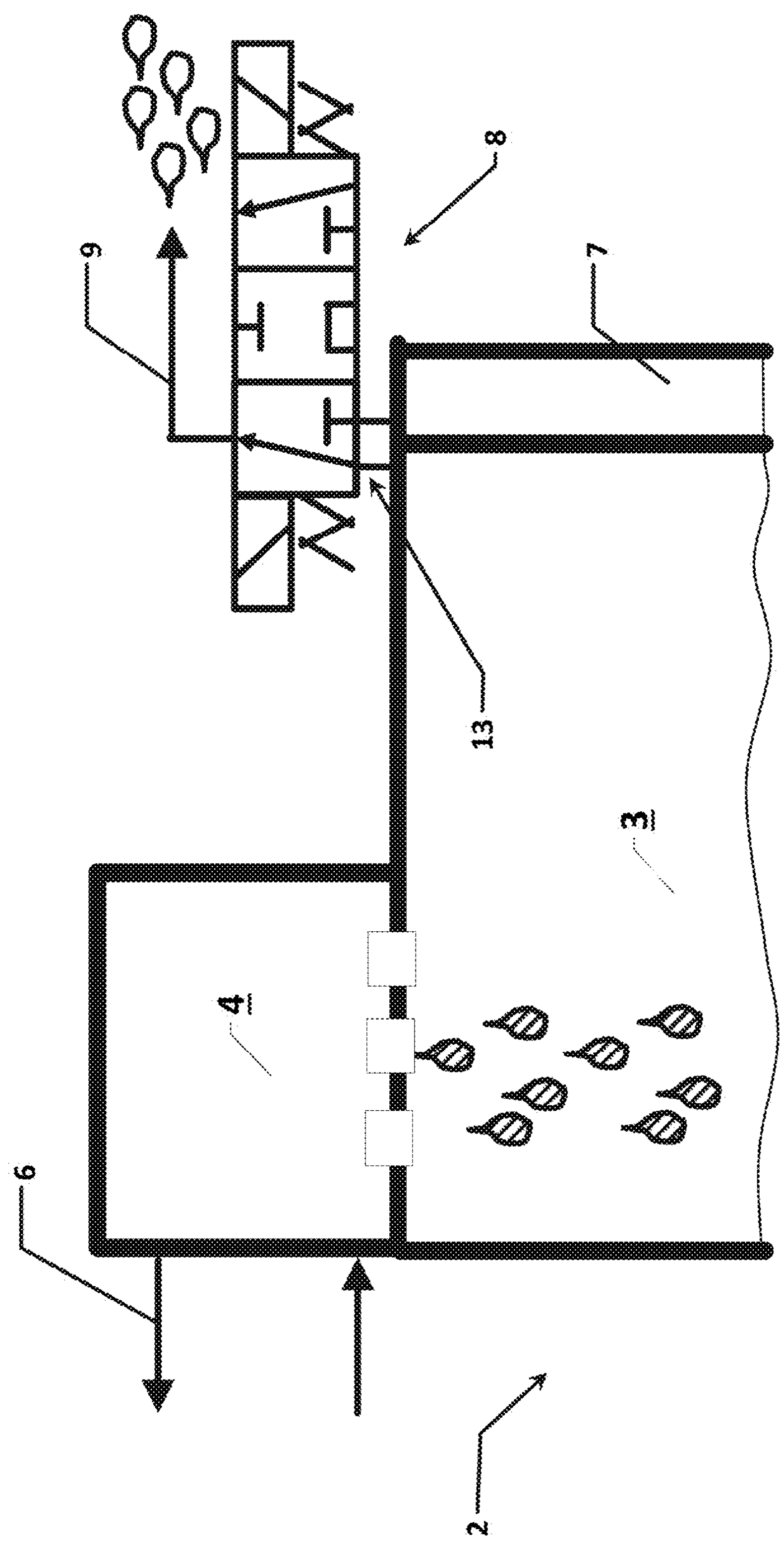
Figure 9:
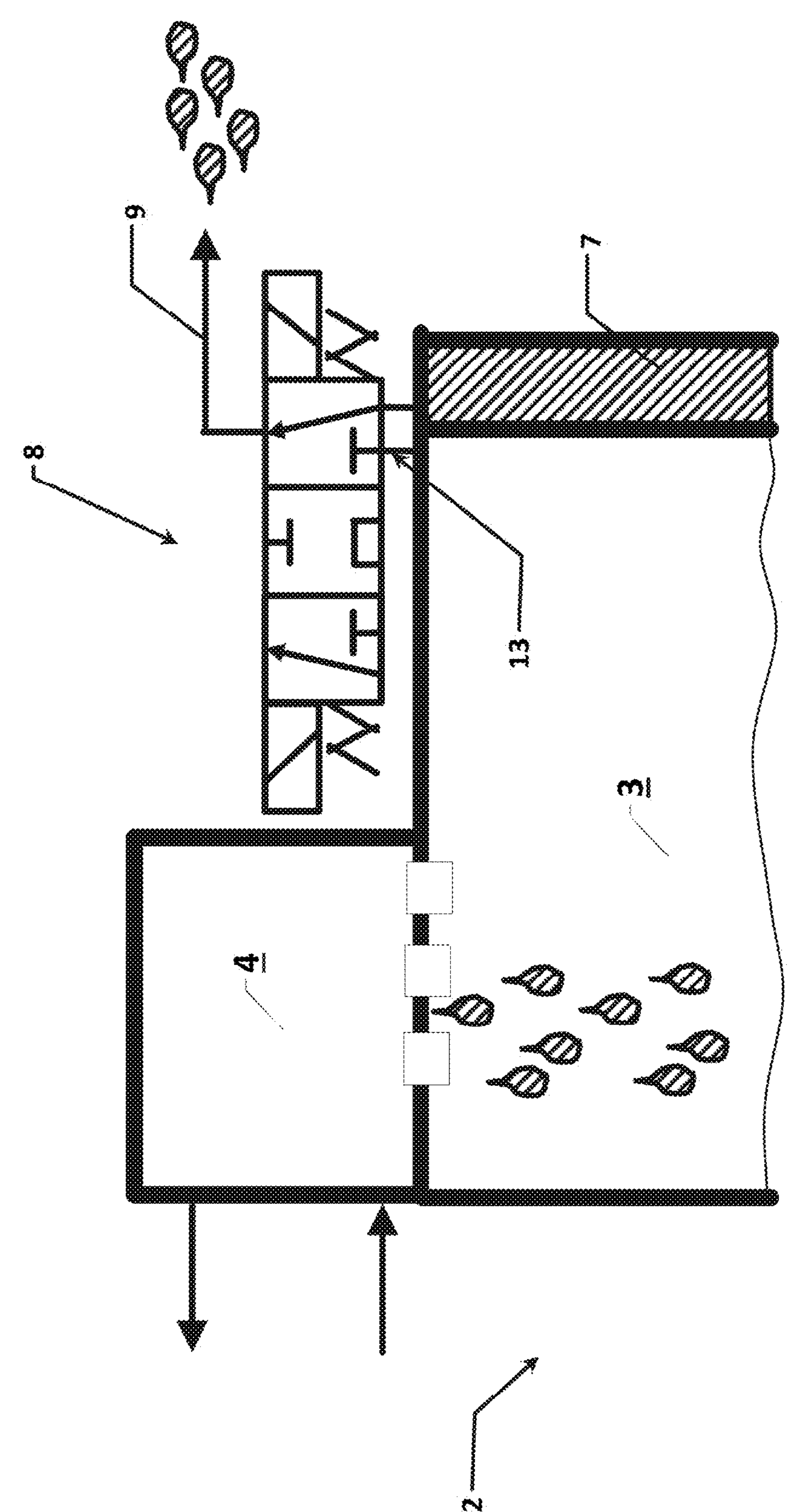
Figure 10:
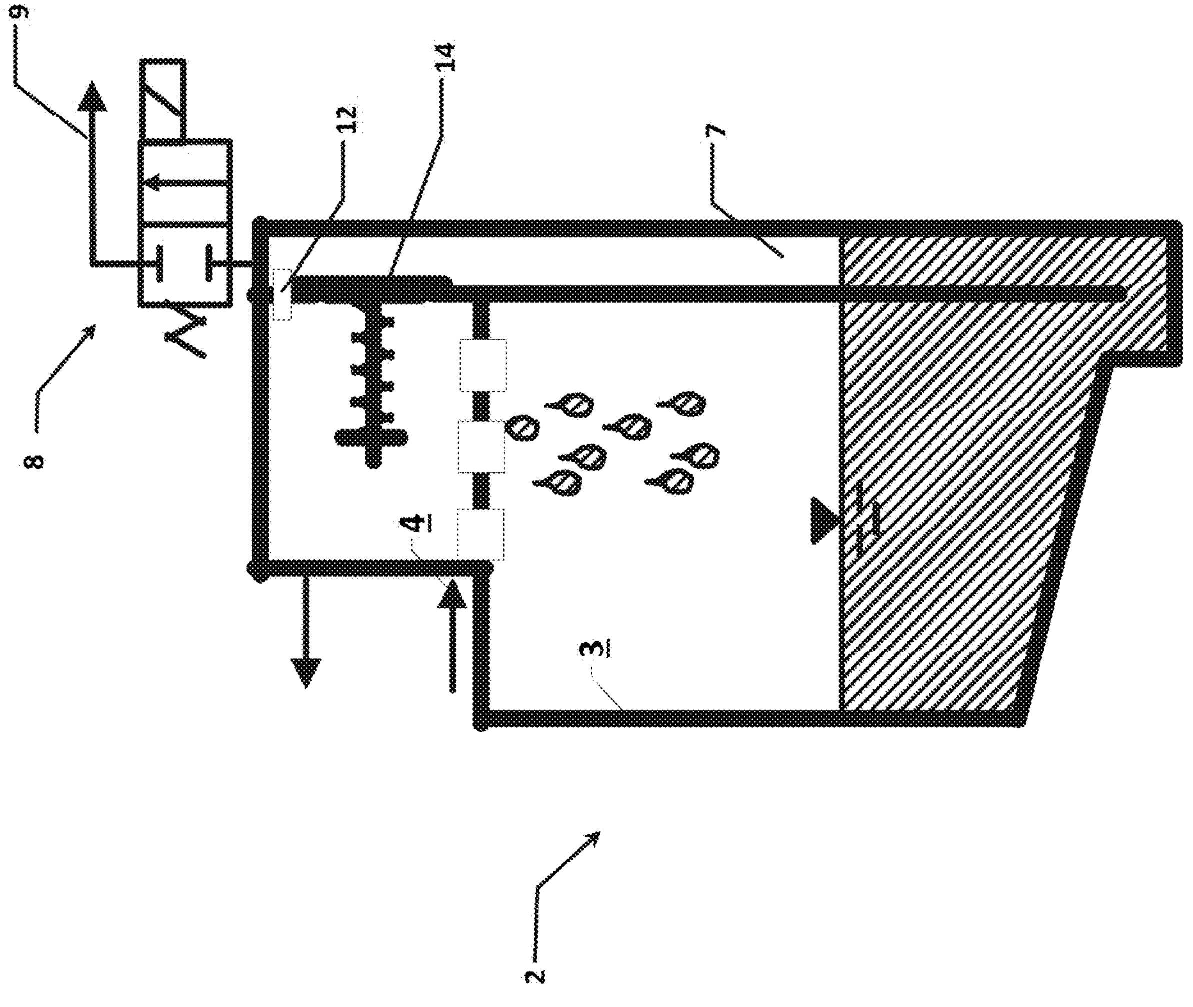

The apparatus and the method according to the present invention are described below by way of example, on the basis of schematic representations. These are very simplified and in particular, for reasons of clarity, necessary and usual elements are not shown, such as control/regulating unit, power and data lines, sensors (pressure, fill level, temperature, etc.), further valves, pneumatic elements, and others, although these are mandatory or must be provided if necessary. In the Figures:

FIG. 1 shows a very simplified process flow diagram as prior art,

FIG. 2 shows a sectional view of the gas management apparatus according to the present invention, FIG. 3 shows the gas management apparatus according to FIG. 1 in a first method state, in a first valve position, FIG. 4 shows the gas management apparatus according to FIG. 1 in a second method state, with a second valve position, FIG. 5 shows the gas management apparatus according to FIG. 1 in a further method state, with the valve position according to FIG. 4, FIG. 6 shows the gas management apparatus with a drainage valve designed as a multi-port valve, FIG. 7 shows the gas management apparatus with a drainage valve designed as a further multi-port valve in a first valve position, FIG. 8 shows the gas management apparatus according to FIG. 7 in a further valve position, FIG. 9 shows the gas management apparatus according to FIG. 7 and FIG. 8 in a third valve position, and FIG. 10 shows the gas management apparatus with an alternative arrangement of the bypass line and the emergency valve.

DETAILED DESCRIPTION OF THE PREFERRED EMBODIMENTS

FIG. 1 shows a highly simplified process flow of a fuel cell. Here, the cathode process section 25, at the left in the Figure, will not be considered further. The necessary oxygen (O2) is supplied to the fuel cell 1 at the cathode side via an air process section 30, although the following descriptions relate overall to the gas process at the anode gas side.

The process gas is fed to the fuel cell 1 via line 19 from a storage tank 16, via lines 17 and a mixer 18, which can be designed as a jet mixer, for example. The H2-depleted gas leaves the fuel cell 1 via the line 20 and is fed to a water separator 4 via the gas supply line 5. The dehumidified gas leaves the water separator 4 via the gas drainage pipe 6.

At the downstream branch, a partial flow is removed (purging) via the valve 11 and is discharged via a line path 21. In mixer 18, H2-rich gas is reintroduced in order to set the required H2 gas concentration. The process gas is subsequently reintroduced into the fuel cell 1 as mentioned above via the line 19. Such processes are known in many embodiments, in particular also processes in which the H2 is not introduced directly as a gas, but as a suitable H2-rich fluid.

The sectional drawing according to FIG. 2 shows the basic structure of the gas management apparatus according to the present invention. The water separator 4 is situated on the fluid tank 2. This separator can be designed as a cyclone, impact separator, or in any other known form. The gas is fed into the water separator 4 via the gas supply line 5 and, dehumidified, leaves the separator via the gas drainage pipe 6. Separated water drips or runs into the interior 3 of the fluid tank 2 and collects in the lower area 3.1. As shown in FIG. 2, the fluid tank 2 is approximately one-third full of water, which is indicated as a hatched area in the lower region 3.1. Inside the inner chamber 3 runs the riser 7, which is designed as a vertical channel. The lower end 7.1 of the riser 7 is open to the inner bottom of the fluid tank 2. The upper end 7.2 of the riser 7 is connected to a drainage valve 8, which opens downstream into a drainage pipe 9. In the example shown, the drainage valve 8 is designed as a simple stop valve.

As an improvement, in the example shown a small bypass line 12 is provided as a small bore below the top side 2.1 of the fluid tank 2, via which bore a constant pressure equalization between the interior 3 and the riser 7 takes place. The optional emergency valve 14 is explained in detail in connection with FIG. 5. Overall, FIG. 1 shows the operating state in which the fuel cell 1 is working and separated water is collected. In this case, no purging (release of H2-poor gas) and also no discharge of liquid water takes place, because the drainage valve 8 is in the closed position.

FIG. 3 shows the subsequent removal step, namely dewatering as the first substep of the removal of fluids. The drainage valve 8 is in the pass-through position, so that due to the pressure differential between the internal pressure in fluid tank 2 on the one hand and drainage pipe 9 on the other hand, the water (hatched area) is pressed into the riser 7 and conducted through the drainage valve 8. The necessary overpressure inside the fluid tank 2 is achieved in a known manner by supplying H2-rich fluid, e.g. at the mixer 18 (FIG. 1). The separation process is not necessarily interrupted during this, as is indicated by the droplets in the interior 3.

FIG. 4 shows the second substep of the removal, namely the removal of the gas (purging), which follows the dewatering. Here the separated water is completely removed via the drainage valve 8 and drainage pipe 9, so that the proportion of gas, in particular low-H2 gas, is subsequently removed until the desired purging rate (H2 concentration) is reached. The bypass line 12, as a permanent opening between the riser 7 and the interior 3, is unproblematic here and does not represent a disadvantage, especially if the cross-section of the bypass line 12 is substantially smaller than the cross-section of the main flow paths.

The method situation shown in FIG. 5 illustrates the not uncommon case where ice has formed in the lower area 3.1 of the interior 3, indicated by the area filled with dashes, so that the inlet near the bottom at the lower end 7.1 of the riser pipe 7 is also closed. The water and gas can no longer be discharged from the interior 3 by increasing the pressure and opening the drainage valve 8. In this case, the emergency valve 14, which is preloaded with a spring, opens in the direction of the pressure drop. The emergency valve 14 is designed as a known pressure relief valve, and leads into the upper area of the riser 7. All fluids can in this way be discharged from the interior 3 via this further bypass, into the riser 7 and further via the drainage valve 8, as indicated by the arrows. Since icing occurs especially during operational standstill, the icing subsequently melts in a short time when the fuel cell 1 is in operation.

FIG. 6 shows an embodiment that is alternative or supplementary to the previous examples. Here, another vent line 13 is provided at the top side 2.1 of the fluid tank 2 with access to the interior 3, and the drainage valve 8 is designed as a multi-port valve. In a first valve position, the pressure equalization with the riser 7 takes place via the inner line paths; here the path to the drainage pipe 9 is blocked. In the second valve position of the drainage valve 8, not switched in FIG. 6, the further vent line 13 would be closed and the path to the drainage pipe 9 would be opened. In this embodiment, the vent line 13 together with the internal line paths of the valve 8 form a bypass line analogous to the bypass line 12 described above.

In the embodiment of the drainage valve 8 shown in FIGS. 7, 8 and 9 as a 3/3 multi-port valve, further valve positions are possible. The first valve position shown in FIG. 7 corresponds to that shown in FIG. 6. Here a pressure equalization takes place between the interior 3 and the riser 7 without fluid removal.

In the second valve position, shown to the left of the first and in FIG. 8, the riser 7 is closed and a connection from the interior 3 to the drainage pipe 9 via the further vent line 13 is open. This allows very fast and precisely adjustable gas removal (purging).

In the third valve position, to the right of the first valve position, the further vent line 13 is closed and the connection from the riser 7 to the drainage pipe 9 is opened. This is shown in FIG. 9. This enables fast and precisely adjustable dewatering of the fluid tank 2.

Finally, FIG. 10 shows a particular installation position of the emergency valve 14 and of the bypass line 12 in the area of or at the level of the water separator 4. In a further embodiment not shown, the emergency valve 14 and/or the bypass line 12 is arranged above the water separator 4 *k.*

It will be immediately apparent to those skilled in the art that the foregoing embodiments can be used in a supplementary or combined manner.

LIST OF REFERENCE SIGNS

1 fuel cell
2 fluid tank
 2.1 top side
 2.2 lower side
3 interior
 3.1 lower area
 3.2 upper area
4 water separator
5 gas supply line
6 gas discharge line
7 riser
 7.1 lower end
 7.2 upper end
8 drainage valve
9 drainage pipe (central)
10 valve (water outlet valve)
11 valve (purge valve)
12 bypass line
13 vent line
14 emergency valve
15 process gas tank
16 storage tank
17 line
18 mixer
19 line
20 cathode process section
30 air process section

The invention claimed is:

1. A gas management apparatus for conditioning anode gas of a fuel cell, the apparatus comprising:
- a fluid tank which, in an installation position, has a top side and a lower side, as well as an interior,
- a water separator, which is fluidically connected to the fluid tank, arranged in the interior of the fluid tank, or both,
- a gas supply line to the water separator,
- a gas drainage pipe from the water separator,
- a riser for water from the fluid tank, the riser being connected at a lower end to a lower region of the interior of the fluid tank, or projecting into the lower region, or both, and being connected at an upper end to a drainage valve,
- wherein the drainage valve is arranged in an upper region of the fluid tank, above a top side of the fluid tank, or both, the drainage valve configured to be connected at an outlet side to a central drainage pipe, and
- wherein gases, liquids, or both are configured to be discharged via the drainage valve during proper operation.

2. The apparatus according to claim 1, wherein the riser is fluidically connected to the interior of the fluid tank via a bypass line, the bypass line being arranged in a bore, or an opening, or both of the riser.

3. The apparatus according to claim 1, further comprising:
- an emergency valve in the riser in the upper region of the interior which is configured to establish a fluidic connection from the interior of the fluid tank into the riser.

4. The apparatus according to claim 3, wherein a bypass line is arranged in the interior and above the emergency valve.

5. The apparatus according to claim 4, wherein the bypass line is provided with a valve which is open in a permanent state and which closes the bypass line above a limit value of a volume flow, an internal pressure in the riser, or a combination thereof.

6. The apparatus according to claim 1, further comprising:
- at least one further vent line via which the interior may be fluidically connected to the drainage valve, wherein the at least one further vent line having no direct fluidic connection to the riser, and wherein the drainage valve comprises a multi-port valve.

7. The apparatus according to claim 6, wherein the drainage valve comprises internal line paths in a valve position in which a fluidic connection is established between the interior of the fluid tank and the riser.

8. The apparatus according to claim 6, wherein the drainage valve comprises internal line paths in a valve position in which a line connection is established between the interior of the fluid tank and the central drainage pipe, with simultaneous closing of the riser.

9. The apparatus according to claim 1, wherein two separate valves with associated lines for discharge of gases, water, or both are not provided.

10. A method for operating a fuel cell and for removing gas, or liquid, or both from an anode gas circuit, the gas and liquid being fed to a water separator via a gas supply line downstream of a fuel cell, and separated liquid being discharged in a fluid tank, the method comprising the steps:
- at least partial emptying the fluid tank via a drainage valve, and,
- at least partial removal of the gas from an anode gas circuit and introduction of clean gas into the anode circuit,
- wherein the at least partial removal of gas from the anode gas circuit, or the at least partial emptying of the fluid tank, or both takes place via the drainage valve, and,
- wherein the drainage valve being situated in an upper region of the fluid tank, or above a top side of the fluid tank, or both.

11. The method according to claim 10, wherein in the at least partial emptying step, in a first sub-step the gas pushes liquid forward through the drainage valve, and in a second sub-step the portion of gas to be discharged is conducted through the drainage valve.

12. The method according to claim 10, wherein an emergency discharge step is provided in which, in the event of an excessive pressure rise, or icing, or both in a lower region of the interior, an emergency valve is opened in an upper region of the interior and fluids that are present are discharged from the interior via the riser and the drainage valve into the central drainage pipe.

13. The method according to claim 10, wherein the bypass line is closed when at least one limit value of the internal pressure, or of the volume flow in the riser, or both is exceeded.

14. The method according to claim 13, wherein the bypass line is closed by a passive check, a pressure relief valve, or both.

* * * * *